United States Patent
Liu

(10) Patent No.: US 7,855,529 B2
(45) Date of Patent: Dec. 21, 2010

(54) INDUCTIVELY POWERED SLEEVE FOR MOBILE ELECTRONIC DEVICE

(75) Inventor: Xun Liu, Ma On Shan (HK)

(73) Assignee: ConvenientPower HK Ltd., Shatin, N.T. (HK)

( * ) Notice: Subject to any disclaimer, the term of this patent is extended or adjusted under 35 U.S.C. 154(b) by 0 days.

(21) Appl. No.: 12/174,550

(22) Filed: Jul. 16, 2008

(65) Prior Publication Data

US 2010/0013431 A1 Jan. 21, 2010

(51) Int. Cl.
*H02J 7/00* (2006.01)
(52) U.S. Cl. .................................................. 320/108
(58) Field of Classification Search ................. 320/108; 230/114, 115
See application file for complete search history.

(56) References Cited

U.S. PATENT DOCUMENTS

| | | | |
|---|---|---|---|
| 6,501,364 B1 | 12/2002 | Hui et al. | |
| 6,888,438 B2 | 5/2005 | Hui et al. | |
| 7,164,255 B2 * | 1/2007 | Hui ............................. | 320/108 |
| 2002/0110013 A1 | 8/2002 | Park et al. | |
| 2003/0210106 A1 | 11/2003 | Cheng et al. | |
| 2004/0150934 A1 | 8/2004 | Baarman | |
| 2005/0162824 A1 | 7/2005 | Thompson | |
| 2005/0189910 A1 | 9/2005 | Hui | |
| 2006/0061326 A1 | 3/2006 | Vine et al. | |
| 2006/0205381 A1 | 9/2006 | Beart et al. | |
| 2006/0226805 A1 * | 10/2006 | Yu ............................. | 320/107 |
| 2007/0029965 A1 | 2/2007 | Hui | |
| 2007/0090790 A1 | 4/2007 | Hui | |
| 2007/0279002 A1 | 12/2007 | Partovi | |
| 2008/0164844 A1 | 7/2008 | Kato et al. | |
| 2009/0102416 A1 * | 4/2009 | Burley ........................ | 320/103 |

FOREIGN PATENT DOCUMENTS

| | | |
|---|---|---|
| EP | 1221753 | 7/2002 |
| GB | 2399466 | 9/2004 |
| WO | WO2004/055654 A2 | 7/2004 |
| WO | WO2009/037380 | 3/2009 |

* cited by examiner

*Primary Examiner*—Edward Tso
*Assistant Examiner*—Richard V Muralidar
(74) *Attorney, Agent, or Firm*—Wells St. John, P.S.

(57) ABSTRACT

There is disclosed a sleeve for holding a portable electronic device such as an MP3 player, mobile telephone, PDA and the like. The sleeve is provided with an integrally formed secondary winding that enables the sleeve to pick up magnetic flux from an inductive charging platform and associated circuitry for generating a DC charging voltage that can be used to charge a battery in the device while the device is received within the sleeve. The sleeve is formed with a connector designed to fit a power/data connection socket in the device, and may also be provided with a connection port enabling the device to be connected to a computer while it is received within the sleeve.

19 Claims, 9 Drawing Sheets

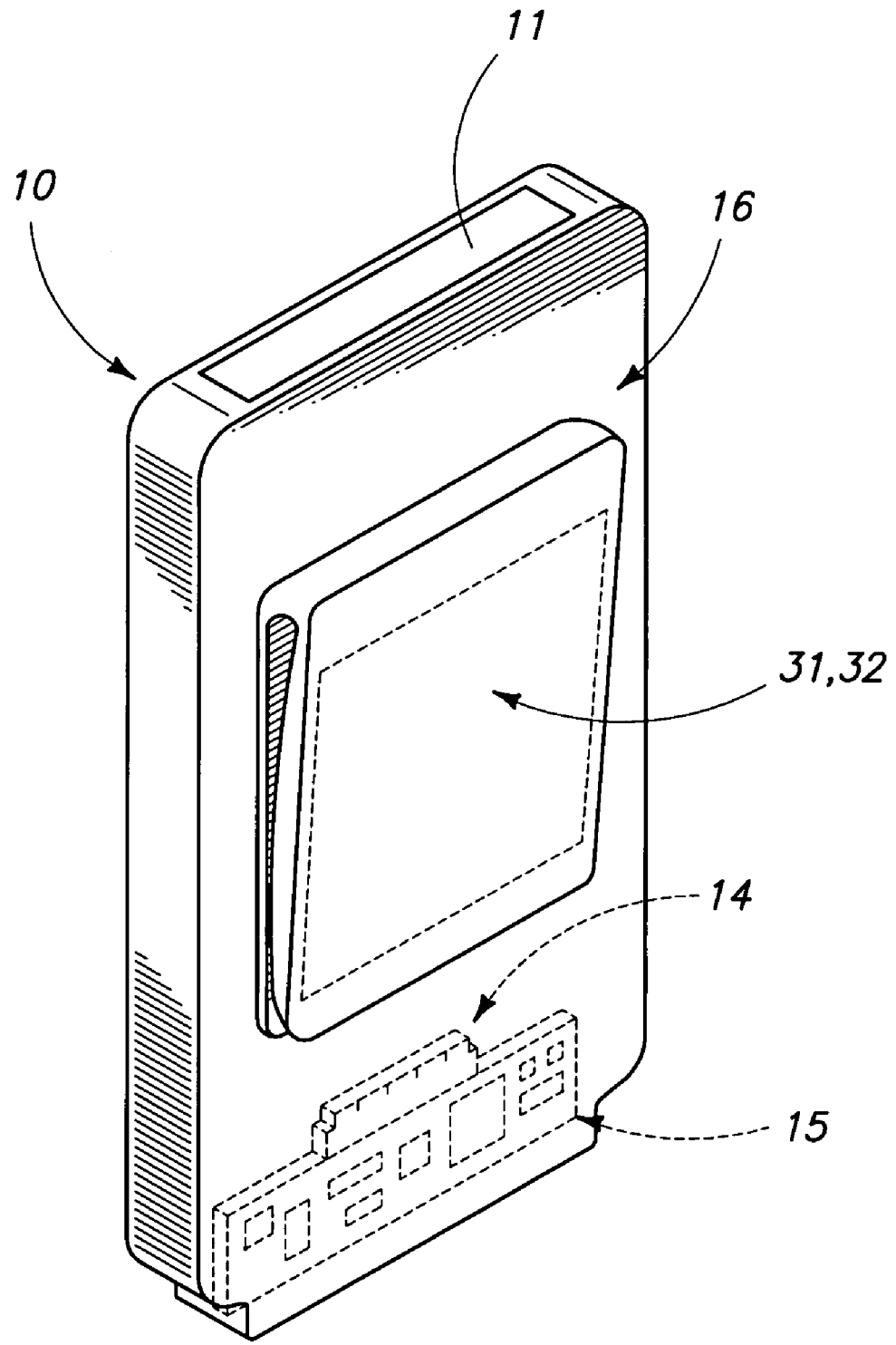

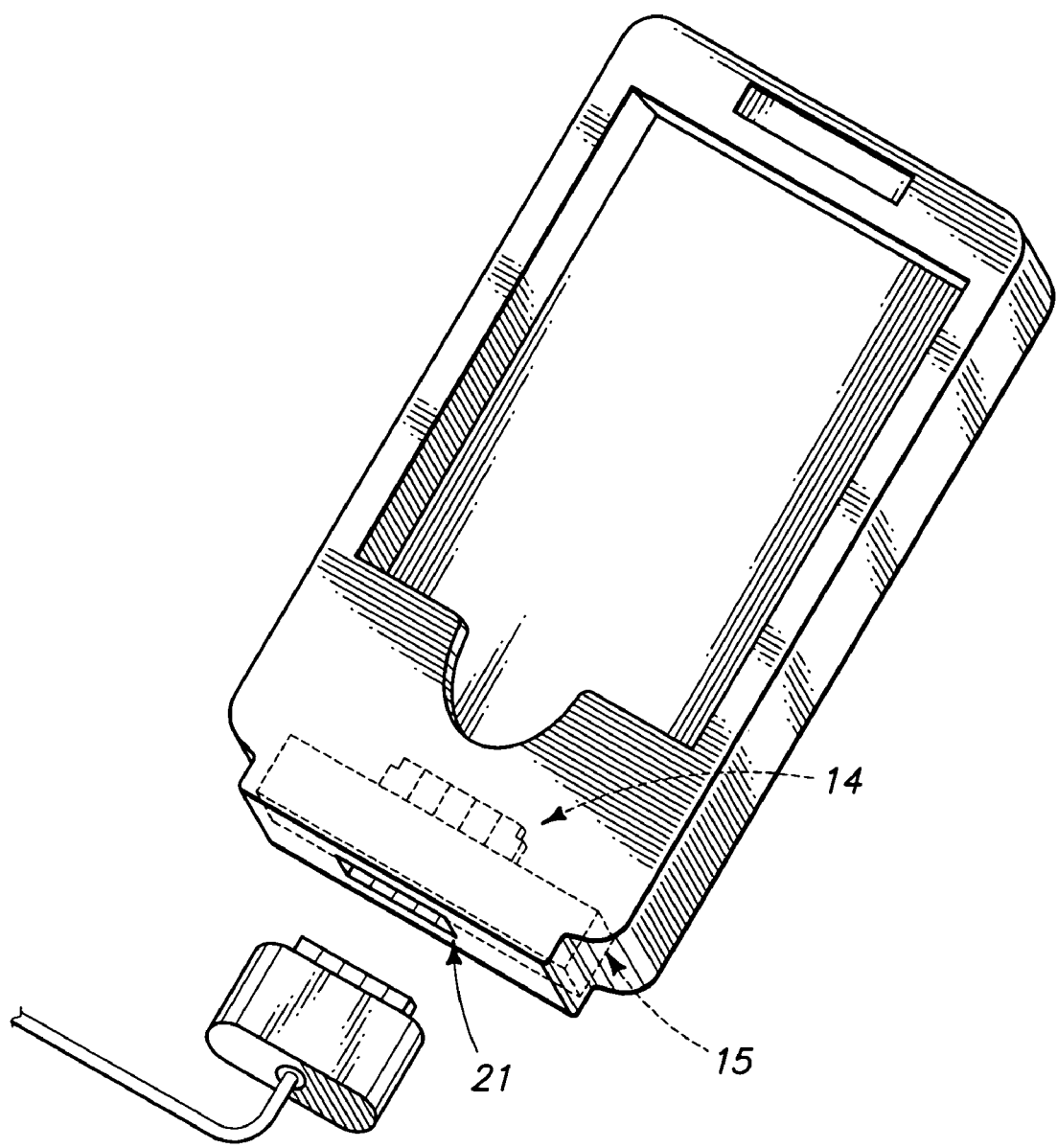

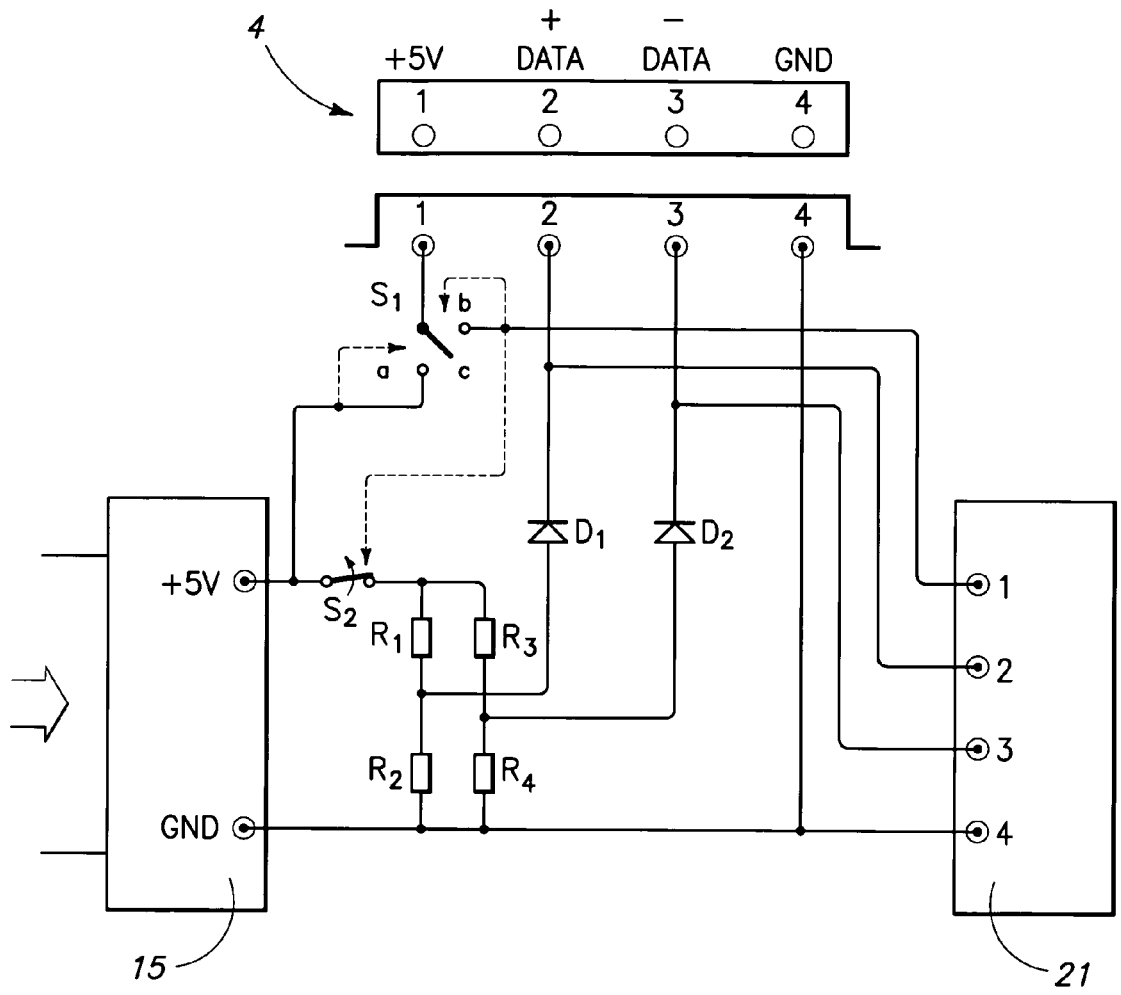

INDUCTIVELY POWERED SLEEVE FOR MOBILE ELECTRONIC DEVICE

FIELD OF THE INVENTION

This invention relates to a sleeve that is designed to receive a mobile electronic device and to enable such a device to be charged by means of an inductive charging system.

BACKGROUND TO THE INVENTION

Mobile electronic devices, including mobile phones, portable music and video players, digital cameras, camcorders, computer peripherals etc. are widely used today. For environmental reasons, such devices are often powered by rechargeable batteries.

There exist a number of methods for charging the rechargeable batteries. As shown in FIG. 1, a first method is to connect the electronic devices 1 to a conventional power line through a power adaptor 2. This method also includes the possibility of removing batteries out of the device and charging them with external chargers, or charging a battery through a USB connection 3 on a PC. No matter what kind of approach is used, the power adaptors and their cables are always cumbersome, and in the case of charging using a USB port, this is restricted by the availability of computers that can be found. Furthermore, the USB port normally can only output a power of 2.5 W which is sometimes lower than the power requirement for recharging and which can cause the charging speed to be slower than a normal battery charger, though it does have the advantage of simultaneous data exchange with the computer at the same time as battery charging.

FIG. 2 shows the pin definition of the connecting port 4 of an exemplary mobile electronic device and its corresponding power/data connector 9. For simultaneous power and data transfer, there are two pins (pin 2 and pin 3) for data connection in addition to the pins (pin 1 and pin 4) used for charging. Many devices have their own charging protocol which needs some predefined voltage level at the data pins to start or continue on charging. For example, some devices need pin 2 and pin 3 to have voltage of 3 V and 2 V, respectively, so that the charging process can be maintained. This requirement can be easily met if the device is charged through a USB port because the data pins can be controlled by the computer. However, when such a device is charged by using a power adaptor 2, a voltage divider as shown in FIG. 2 must be used to provide the required voltage level for data pins.

To get rid of the power wire or the USB connector one possible solution is to use an inductive battery charging platform examples of which are disclosed in U.S. Pat. No. 7,164, 255B and US20070029965A. As shown in FIG. 3, the mobile electronic device is inductively coupled with a charging platform 5 which eliminates the need for charging cables to the device. The charging platform 5 is provided with one or more primary windings that generate a magnetic flux that can be picked up by a secondary winding 6 which may be provided integrally with the electronic device. For example, the electronic device may be provided with an inductive energy receiving unit (IERU) 7 which includes the secondary winding 6 and the associated processing circuitry 8 as shown in FIG. 4.

As shown in FIG. 4, an energy receiving winding or coil 6 receives magnetic flux from the charging platform, and the received AC energy is rectified and regulated to a suitable DC voltage to charge the battery. In the prior art it is known that the IERU 7 may be integrated into the device or into the battery pack (US20070029965A) and this is the best approach for future devices. Also known is that the IERU 7 may be integrated into a new back cover for a device which may be used to replace the original (US20060061326A, US20060205381A).

However, there is a need to enable existing devices that are not provided with such an integral IERU—or devices where it is difficult to provide an integrated IERU—to be charged using such an inductive charging platform. One solution to this is to provide the IERU in an external module which is attachable to the back of the device (GB2399466B, US20060205381A). The output of IERU is connected to the connecting port of the device through a short wire or through a power connector. This is a straightforward approach to adapt conventional devices to the charging platform. However, the added module is an extra 'burden' to the devices, which has no other function or attraction to a consumer.

SUMMARY OF THE INVENTION

According to the present invention there is provided a sleeve for receiving a mobile electronic device, the sleeve including a winding for receiving magnetic flux from an inductive charging system, an energy processing circuit for generating a DC output voltage from the magnetic flux, and electrical connection means for connecting the circuit to a device received within the sleeve whereby the device may be charged by placing the sleeve with the device therein on a surface of an inductive charging system.

Preferably the sleeve comprises at least one planar surface and the winding is a planar winding integrally formed with the surface. Electromagnetic shielding may be provided between the winding and a side of the surface facing a device when received in the sleeve.

Preferably the planar winding is formed on a printed circuit board, and the energy processing circuit may be formed on the same printed circuit board as the planar winding. Alternatively, the energy processing circuit and the electrical connection means are formed on one printed circuit board.

The connection means is preferably a combined power and data connector adapted to be received within a combined power and data socket formed in a device.

In one embodiment of the invention the sleeve is provided with an attachment clip and the winding is provided as part of the clip. The clip may further comprise electromagnetic shielding on a side of the clip that in use will face a device received within said sleeve.

The energy processing circuit may preferably include a diode provided at the output of the circuit to prevent reverse current flow. The sleeve may also be provided with a port for connecting a device received therein to an external power source such as a computer or a power adaptor.

Preferably means are provided for disabling either the energy processing circuit or the external power source when both are provided. When the energy processing circuit is disabled, preferably the inductive charging system may also be disabled. Preferably the energy processing circuit is provided with means for clamping data pins of said device at predetermined voltages and said clamping means is disabled when said external power source is provided.

BRIEF DESCRIPTION OF THE DRAWINGS

Some embodiments of the invention will now be described by way of example and with reference to the accompanying drawings, in which:

FIG. 8 is a back view of the sleeve in an alternative embodiment, FIG. 10 shows a sleeve according to a further embodiment of the invention, and FIG. 11 shows schematically an alternative electrical connection between the sleeve and an electronic device.

DETAILED DESCRIPTION OF PREFERRED EMBODIMENTS

As will be seen from the following description, in preferred embodiments of the present invention the inductive energy receiving unit (IERU) is integrated with a sleeve that is designed to receive at least a part of an electronic device. The sleeve provides the benefits of (a) receiving inductive energy (b) protecting the mobile device, and (c) also the sleeve can be provided with a decorative pattern, or advertising or promotional material. It will be understood in this regard that the term "sleeve" is intended to cover any article that is designed to hold a mobile electronic device.

Figure 5:
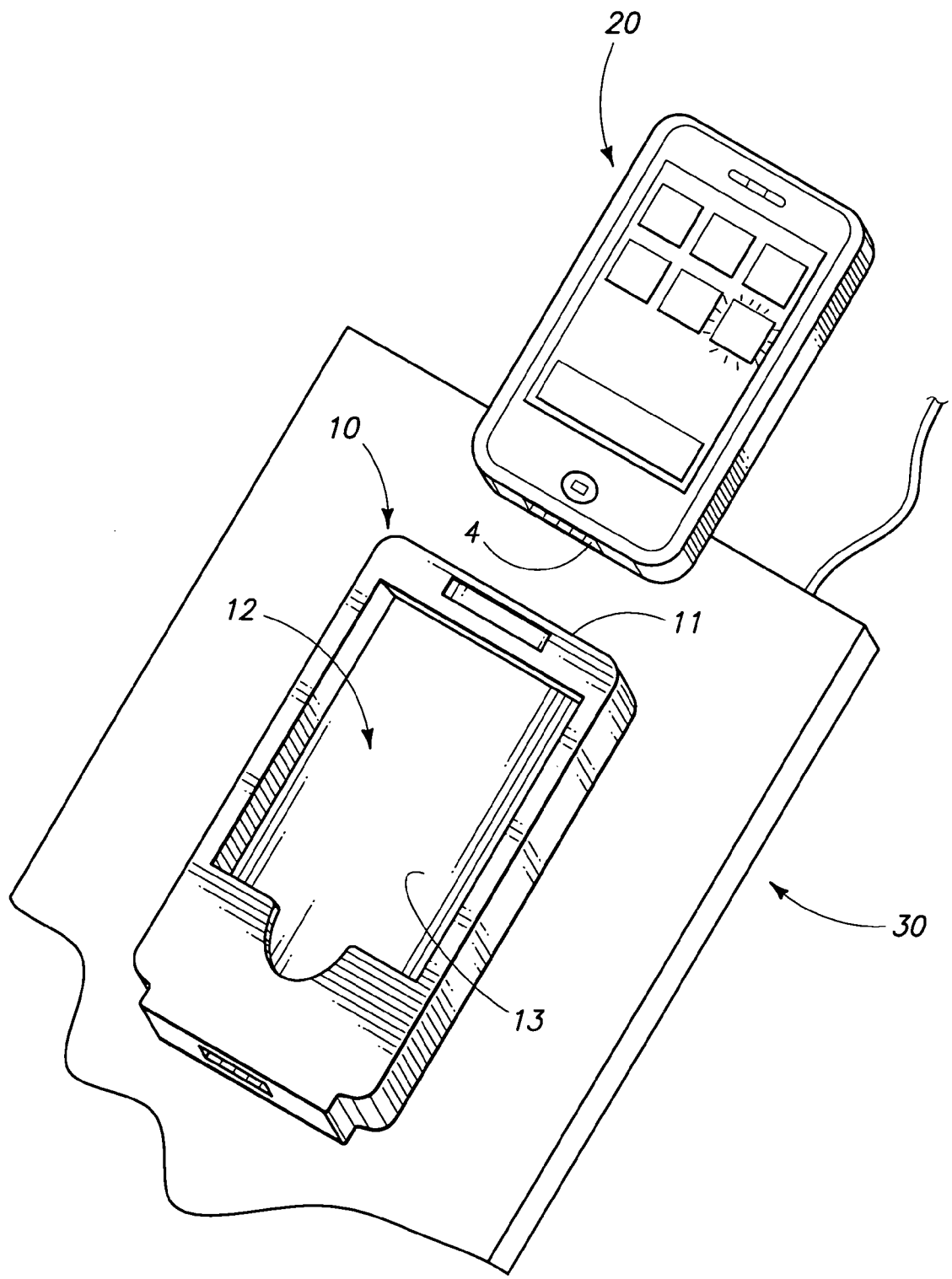
FIG. 5 illustrates schematically a first embodiment of the invention.

FIG. 5 shows a first embodiment of the invention. This embodiment includes a sleeve 10 that is of such a size that it can receive a mobile electronic device 20. The sleeve can be made of silicone, leather, vinyl, plastic, fabric, or any other material suitable to make a sleeve for mobile electronic device protection. It will be understood that the dimensions of the sleeve will be chosen depending on the size and shape of a mobile electronic device that it is intended to receive. A range of differently sized sleeves may be provided. The sleeve should be sized such that it is sufficiently large to permit the electronic device to be inserted into and removed from the sleeve though an opening 11 provided at one end of the sleeve, while being a sufficiently tight fit that the device is held securely. The sleeve may be formed of any suitable material which may include a resilient material chosen to assist the holding of the device by the sleeve.

The sleeve 10 may also be provided with one or more further openings 12 to allow a user to access the device 20 when it is received therein including accessing any control buttons, touch screen or the like, or to enable any camera, microphone or the like that forms part of the device to function properly. The sleeve is formed integrally with the IERU such that the sleeve may receive energy inductively when it is placed on or in proximity with the charging platform 30. For example, one or more secondary windings may be formed in the back face 13 of the sleeve with the associated power electronics being provided at a suitable location as will be described further below.

Figure 4:
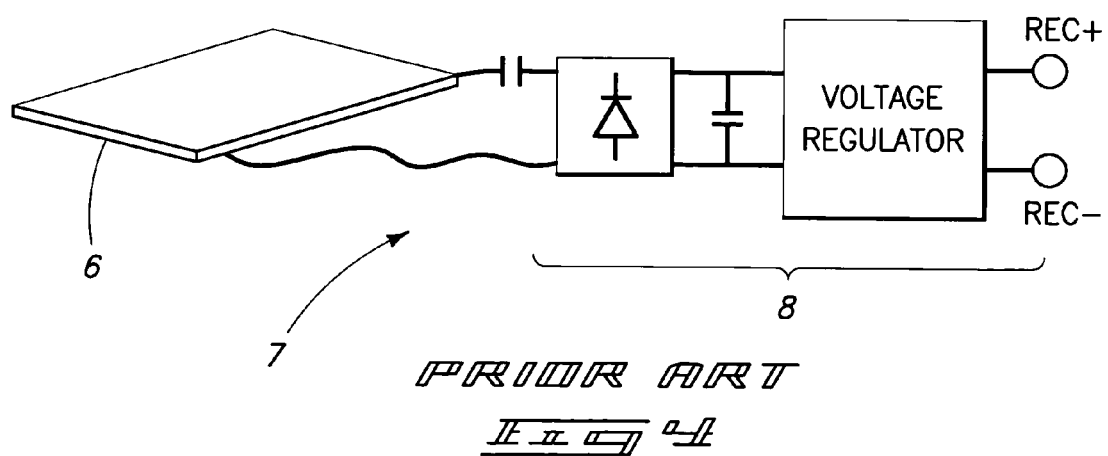
FIG. 4 illustrates an inductive energy receiving unit for use in the prior art.
Figure 6:
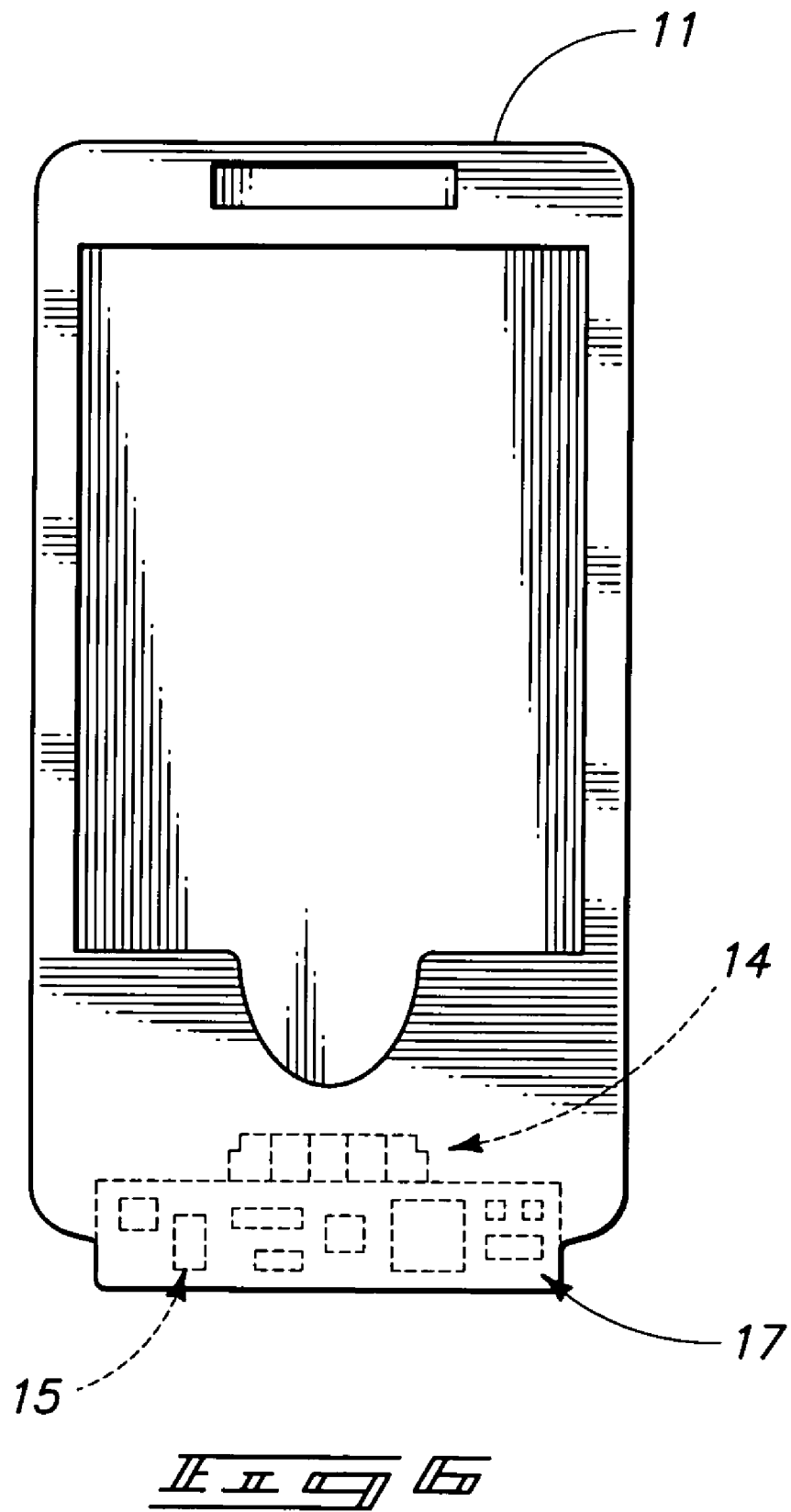
FIG. 6 is a view of a sleeve for use in an embodiment of the invention, FIGS. 7(a) and (b) are cross-sectional views of the sleeve of FIG. 6.

As can be seen from FIG. 6, which is a top view of the sleeve, at the end of the sleeve remote from the opening 11 through which the device is inserted into the sleeve, there is provided a power/data connector 14. When the mobile electronic device is inserted into the sleeve 10, the power/data connector 14 engages the connecting port 4 of the mobile electronic device. FIG. 6 also shows the associated energy processing circuitry 15. Processing circuitry 15 may comprise a printed circuit board 17 (PCB) with electronic components mounted on it including the rectifier and regulator as shown in FIG. 4. The rectifier rectifies the received high frequency AC signal to DC and may take any suitable form including a full-bridge rectifier, voltage doubler, current doubler, center-tap rectifier or forward rectifier. In the embodiment shown in FIG. 6 the processing circuitry 15 is adjacent the power/data connector 14 but it will be understood that this is not essential.

Figure 7A:
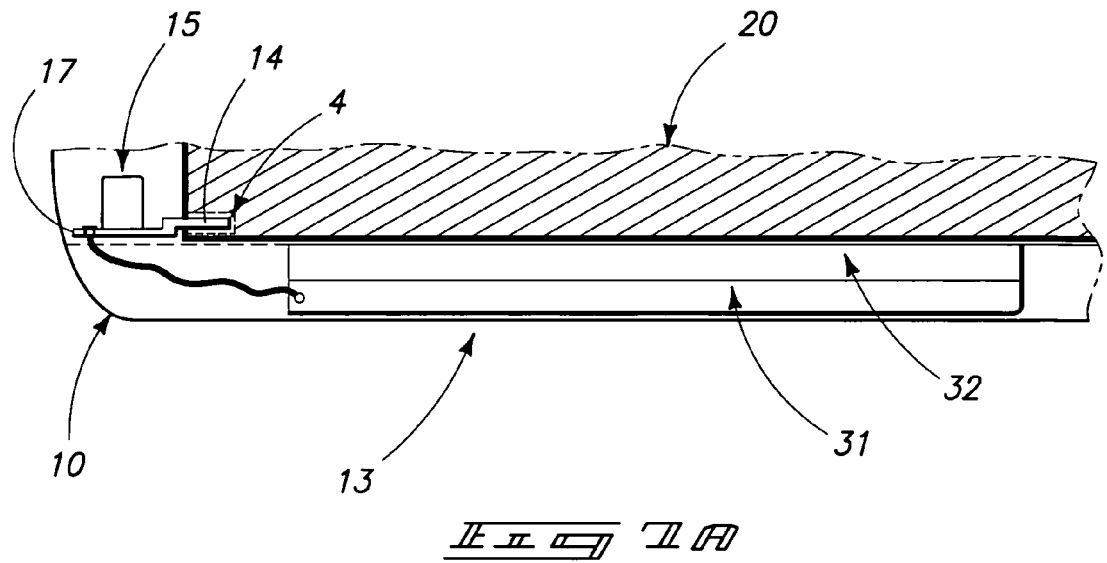

Detailed examples of two possible structures for the sleeve in particular with regard to the location of the processing circuitry 15 are shown in FIGS. 7(a) and (b) which are cross-sectional views of the sleeve 10 together with a mobile electronic device 20 inserted inside. For simplicity, only a part of the back face 13 of the sleeve 10 is shown. In this context it should be noted that the term 'back' means the side intended to face the inductive battery charging platform in a charging operation.

In the embodiment of FIG. 7(a) the energy processing circuitry 15 is placed beside the power/data connector 14. The energy processing circuitry 15 and the power/data connector 14 may, but not are limited thereto, share the same PCB 17. The input of the energy processing circuitry is the received AC energy from a secondary energy receiving winding layer 31, while its output is a DC supply that is connected to the connector 14 which is inserted in the connecting port 4 of the device 20. One important design issue of this structure is to make the back wall of the sleeve as thin as possible. To achieve this goal, the thickness of the winding layer 31 as well as the shielding layer 32 must be minimized. The energy receiving winding layer 31 may take the form of one or more conductive windings formed on a PCB which may have a thickness of only a few hundred microns. The other structures for the winding layer 31 are possible however and may include one or more windings in the form of a planar spiral coil. The shielding layer 32 is important as it is designed to prevent magnetic flux leakage into the device and which may detrimentally influence the operation of the device. The shielding layer 32 may be a double-layer shielding structure which contains a layer of soft-magnetic material and a layer of conductive material as described in U.S. Pat. No. 6,501,364B and U.S. Pat. No. 6,888,438B. Such a structure can have a thickness of only a few hundred microns and can still provide acceptable shielding effectiveness.

Figure 7B:
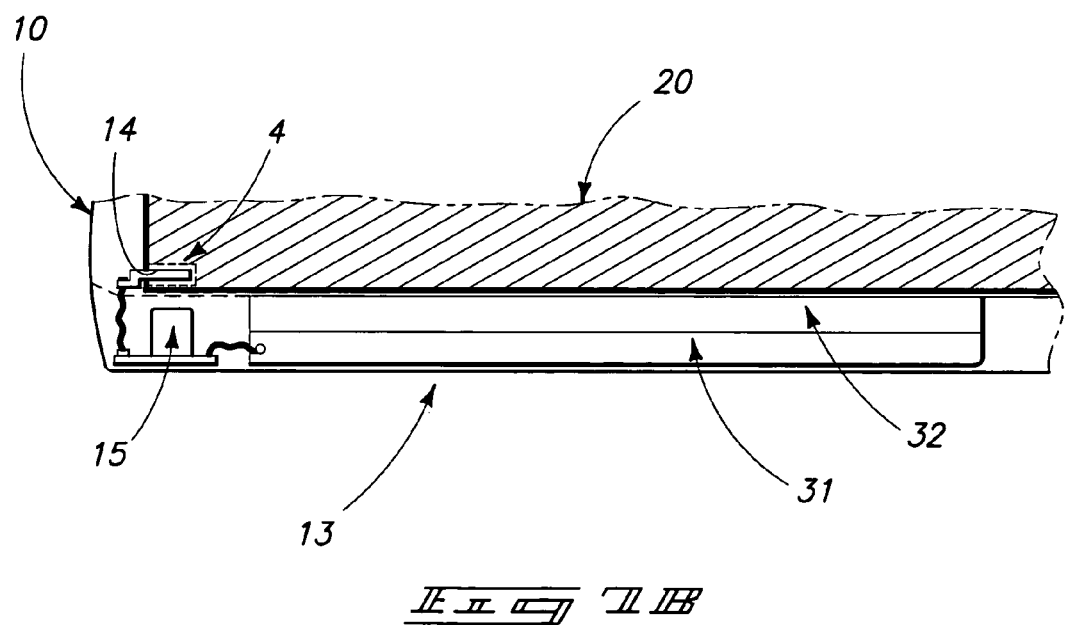

Another possible structure is shown in FIG. 7(b) in which the energy processing circuitry 15 is placed beside the winding and shielding layers 31, 32, instead of the connector 14. This embodiment has the advantage of reducing the minimum length of the sleeve, compared to FIG. 7(a). However, this approach can only be implemented if the height of the components in the energy processing circuitry is low enough. In this embodiment, the energy processing circuitry 15 and the winding layer 31 may, but are not limited thereto, share the same PCB.

Another embodiment is shown in FIG. 8 which is a back view of a sleeve 10. The sleeve 10 is provided with a clip 16 at the back which may be used for attaching the sleeve to a bag or a belt or the like. As shown in FIG. 8, the winding and shielding layers 31,32 can be formed as part of the clip 16. The only limitation is the size of the belt clip which must be large enough to contain the winding and shielding layers 31, 32.

Figure 1:
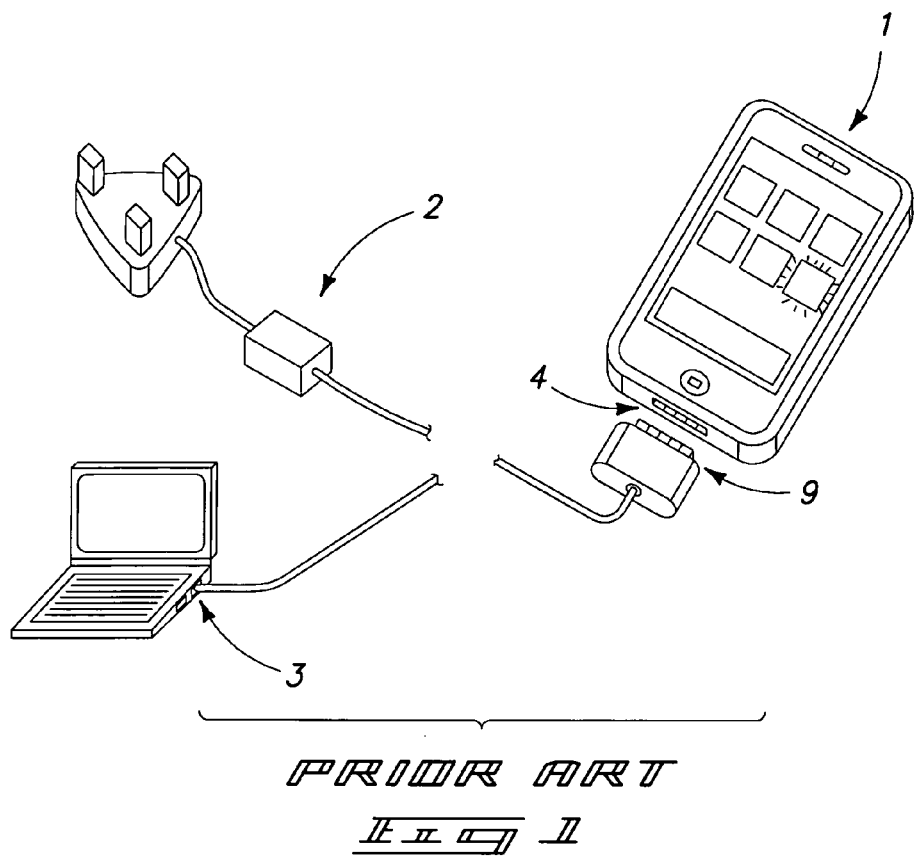
FIG. 1 illustrates schematically prior art methods for charging mobile electronic devices.
Figure 2:
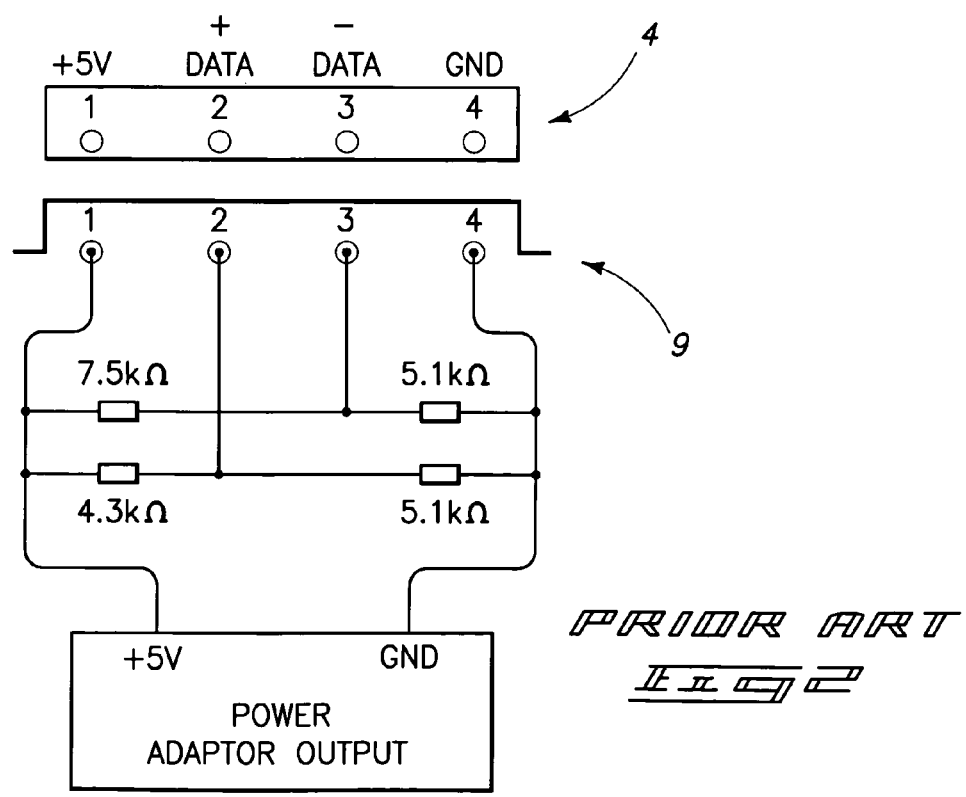
FIG. 2 illustrates a typical configuration of data and charging pins for a device to be charged via a USB port or a power adaptor.
Figure 3:
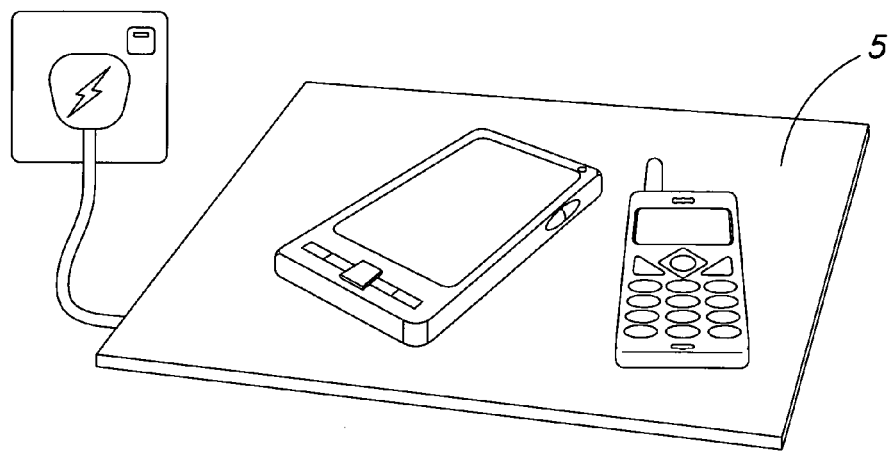
FIG. 3 illustrates an inductive battery charging platform according to an example of the prior art.
Figure 9:
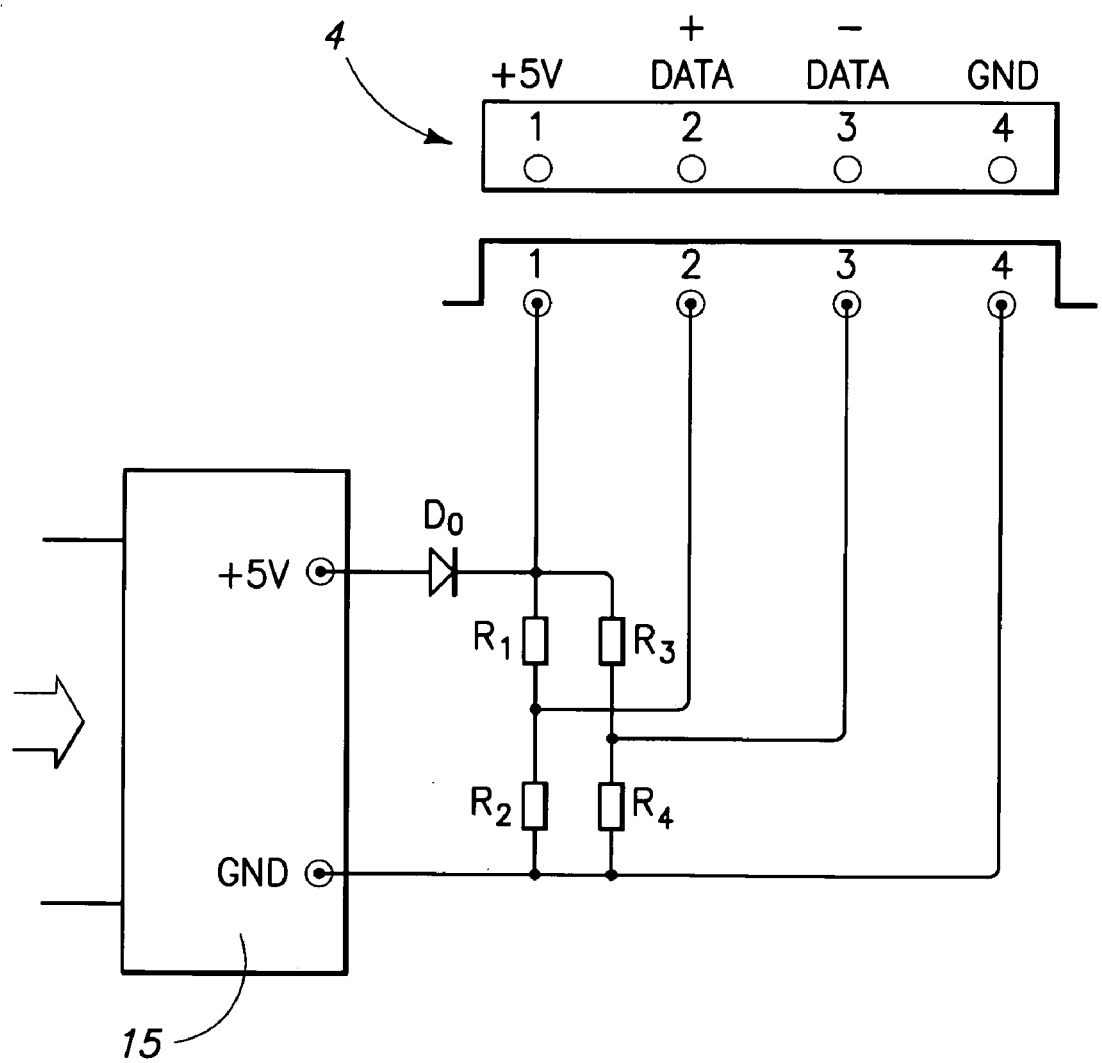
FIG. 9 shows schematically the electrical connection between the sleeve and an electronic device.

In all the above embodiments, the power/data connector 14 is always connected with the connecting port 4 when the device 20 is inserted in the sleeve 10. To avoid energy leakage from the device (battery) to the energy processing circuitry 15, especially when the device is not being charged, a diode ($D_0$ in FIG. 9) is added at the output of the energy processing circuitry 15 to prevent any reverse current. In addition, in FIG. 9, R1-R4 are four resistors that provide required voltage levels to the data pins of the power/data connector 14 as discussed above with reference to FIG. 2. If other charging protocols are required by the data pins, a corresponding method for providing controlled voltages to the data pins can be provided.

It will be understood that in the above embodiments when a device 20 is put into the sleeve 10, the connecting port 4 of the device is occupied by the power/data connector 14 of the sleeve 10. It would therefore not be possible to connect the device 20 to a computer (or to a dock) through a USB connector for data transfer while the device is in the sleeve 10 as there would be no usable port. A straightforward solution for all the above embodiments is to take the device 20 out of the sleeve and connect it through a USB cable to a USB port in a computer in a conventional manner. However this is cumbersome for many users and frequent plug and unplug of the connectors in the sleeve may shorten its life.

A better solution is shown in the embodiment of FIG. 10. Compared to FIG. 5-FIG. 8, the sleeve in FIG. 10 further has an external port 21 through which the device can be connected to a computer (or another external charger if needed). The external port 21 can be a part of the energy processing circuitry 15 or may be placed anywhere on the sleeve. With this external port 21, a user can place the sleeve 10 (including the device 20) on an inductive charging platform for charging or connect the device 20 to a computer without taking the device 20 out of the sleeve 10.

However, if a user were to simultaneously place the sleeve 10 (including device 20) on the charging platform and connect it to a computer, problems may arise. Firstly, the received energy from the IERU may destroy the USB port of a computer. Secondly, the voltage level of the data pins (pin 2 and pin 3 in FIG. 9) are clamped at 3 V and 2 V, respectively, so that data transfer is disabled. To solve these potential problems, the energy from one input (IERU or external port) must be disabled. A possible embodiment of a circuit to implement this idea is shown in FIG. 11. In FIG. 11, a switch, $S_1$ is an added switch to select the energy input from the energy processing circuitry 15 or from the external port 21. $S_1$ is normally at the position of 'c', when no energy is input. When the DC output of energy processing circuitry 15 is high, $S_1$ is controlled to be at the position of 'a'. The device is solely powered by IERU. When pin 1 of the external port 21 is high, (which means that it has been connected to a computer) $S_1$ is controlled to be at the position of 'b; and the device is solely powered by the external port. Pin 1 at high also has the function to turn off $S_2$ which is another added switch. When the device is connected to a computer, data pins (pin 2 and pin 3) are solely controlled by the computer so that data transfer is enabled. D1 and D2 are two diodes added to avoid the voltage at the data pins from going back into the R1-R4 circuit.

In a possible situation that the DC output of energy processing circuitry 15 and pin 1 of external port 21 are both high, the following possibilities exist:

1) Position 'a' of switch $S_1$ has higher priority. No matter whether the device is connected to a computer or not, it is always powered by the inductive charging platform. This approach has the advantage of simultaneously charging with higher power (than 2.5 W of USB) and data transfer (because $S_2$ has been turned off).

2) Position of 'b' of switch $S_1$ has higher priority. No matter whether the device is placed on an inductive charging platform or not, it is always powered by the external port. Furthermore, (not shown in FIG. 11), under this condition, the status of pin 1 of the external port can be fed into a MCU (Micro Controller Unit) of the energy processing circuitry 15. If pin 1 of the external port is high, the MCU may also send information back to the charging platform through a suitable communication method to stop the power transfer at all, which further saves energy.

The above two possibilities can be chosen based on the requirement of customers.

The invention claimed is:

1. A sleeve for receiving a mobile electronic device, said sleeve including a winding for receiving magnetic flux from an inductive charging system, an energy processing circuit for generating a DC output voltage from said magnetic flux, and electrical connection means for connecting said circuit to said device received within said sleeve whereby said device may be charged directly by said inductive charging system by placing said sleeve with the device therein on a surface of said inductive charging system and wherein said winding, said energy processing circuit, and said electrical connection means are integrated with said sleeve as a single unit.

2. A sleeve as claimed in claim 1 wherein said sleeve comprises at least one planar surface and said winding is a planar winding integrally formed with said surface.

3. A sleeve as claimed in claim 2 wherein electromagnetic shielding is provided between said winding and a side of said surface facing a device when received in said sleeve.

4. A sleeve as claimed in claim 2 wherein said planar winding is formed on a printed circuit board.

5. A sleeve as claimed in claim 4 wherein the energy processing circuit is formed on the same printed circuit board as said planar winding.

6. A sleeve as claimed in claim 1 wherein said energy processing circuit and said electrical connection means are formed on one printed circuit board.

7. A sleeve as claimed in claim 1 wherein said connection means is a combined power and data connector adapted to be received within a combined power and data socket formed in said device.

8. A sleeve as claimed in claim 1 wherein said sleeve is provided with an attachment clip and wherein said winding is provided as part of said clip.

9. A sleeve as claimed in claim 8 wherein said clip further comprises electromagnetic shielding on a side of said clip that in use will face a device received within said sleeve.

10. A sleeve as claimed in claim 1 wherein said energy processing circuit includes a diode provided at the output of said circuit to prevent reverse current flow.

11. A sleeve as claimed in claim 1 wherein said sleeve is provided with a port for connecting a device received therein to an external power source.

12. A sleeve as claimed in claim 11 wherein said external power source comprises a computer or a power adaptor.

13. A sleeve as claimed in claim 11 further comprising means for disabling either said energy processing circuit or said external power source when both are provided.

14. A sleeve as claimed in claim 13 further comprising means for disabling the inductive charging system when said energy processing circuit is disabled.

15. A sleeve as claimed in claim 13 wherein said energy processing circuit is provided with means for clamping data pins of said device at predetermined voltages and said clamping means is disabled when said external power source is provided.

16. A sleeve as claimed in claim 1 wherein the electrical connection means is configured to provide the DC output voltage from the energy processing circuit directly to a mobile electronic device to charge a battery within the mobile electronic device to implement the charging of the mobile electronic device.

17. A sleeve as claimed in claim 16 wherein the energy processing circuit is configured to generate the DC output voltage directly from said magnetic flux received by the winding from the inductive charging system.

18. A sleeve as claimed in claim 1 wherein the sleeve is configured to charge the mobile electronic device using only a single inductive power transfer of energy provided by the inductive charging system.

19. A sleeve as claimed in claim 1 wherein the sleeve comprises a single unitary housing which provides the winding, the energy processing circuit and the electrical connection means in fixed physical positions with respect to one another.

* * * * *